United States Patent [19]

Misawa et al.

[11] 4,405,419

[45] Sep. 20, 1983

[54] METHOD FOR PRODUCING ELECTROLYTIC MANGANESE DIOXIDE

[75] Inventors: Masatoshi Misawa; Kusuhiko Takahashi, both of Tokyo; Kinnosuke Okuda, Kisarazu; Kiyoshi Matsuura, Gunma; Hisao Takehara; Keiichiro Ishikawa, both of Ichikawa, all of Japan

[73] Assignee: Japan Metal and Chemical Co., Ltd., Tokyo, Japan

[21] Appl. No.: 215,849

[22] Filed: Jul. 12, 1980

[30] Foreign Application Priority Data

Dec. 13, 1979 [JP] Japan .............................. 54-161839
Feb. 5, 1980 [JP] Japan .............................. 55-12862
Dec. 13, 1979 [JP] Japan .............................. 54-161840

[51] Int. Cl.³ ............................................. C25B 1/00
[52] U.S. Cl. ................................................. 204/96
[58] Field of Search ............... 204/96; 252/182.1, 518, 252/62.2; 429/224

[56] References Cited

U.S. PATENT DOCUMENTS 3,065,155 11/1962 Welsh .................................... 204/96
3,951,765 4/1976 Everett ................................. 204/96

FOREIGN PATENT DOCUMENTS 2042193 8/1970 Fed. Rep. of Germany .
45-25290 8/1970 Japan .
940538 4/1962 United Kingdom .

*Primary Examiner*—Howard S. Williams
*Attorney, Agent, or Firm*—Parkhurst & Oliff

[57] ABSTRACT

A method for producing electrolytic manganese dioxide is disclosed, comprising the electrolysis of a slurry of particles of manganese oxides in an aqueous solution of manganese sulfate. The concentration of the particles of manganese oxides is 0.01 to 0.4 grams per liter of the solution.

16 Claims, 2 Drawing Figures

METHOD FOR PRODUCING ELECTROLYTIC MANGANESE DIOXIDE

This invention relates to a method of producing electrolytic manganese dioxide for dry battery cells.

Three types of manganese dioxide are available for dry battery cells, and one of them is electrolytic manganese dioxide. Electrolytic manganese dioxide ("EMD") is ordinarily produced by electrolysis of an aqueous solution of manganese sulfate using carbon or titanium anodes.

As cathodes, carbon electrodes are normally used.

The present invention relates to a process for producing electrolytic manganese dioxide for dry battery cells.

As manganese dioxide used for dry battery cells, natural manganese dioxide, chemical manganese dioxide and electrolytic manganese dioxide are known and are selectively used depending on specific purposes. Among these, electrolytic manganese dioxide (hereinafter referred to as "EMD") is known as providing the highest battery performance which is one of the important properties for dry battery cells.

The EMD used heretofore is generally produced by electrolysing an electrolyte of an acidic solution of $MnSO_4$ in sulfuric acid at about 90° C. or higher temperatures in an electrolytic cell provided with a titanium, lead or carbon anode and carbon cathode. The product EMD is electrolytically deposited on the anode plate. In such conventional processes, the current density which is a determining factor of the productivity ranges from 0.8 to 1.2 $A/dm^2$, although it may vary depending on the type of anode plate used. Ordinarily, there is no problem with such a current density. However, increasing the current density to increase the productivity causes the bath voltage of the electrolytic cell to increase, rendering the operation impossible in a short time. Also, the current efficiency decreases, resulting in an unfavorable unit in power consumption. Further, the resultant EMD itself has a decreased battery performance.

The present invention has for its object to provide a novel process for producing EMD that secures a stable operation at a higher current density than the conventional current density without entailing the aforementioned drawbacks. More specifically, the present invention provides a novel process for producing EMD by electrolysis of an electrolyte which is prepared by mixing and uniformly dispersing finely powdered manganese oxides in a manganese sulfate solution so that the resultant electrolyte contains 0.01 to 0.4 g/l of manganese oxides.

As the manganese oxides added to the electrolyte according to the present invention, EMD or calcinated EMD may be used after being pulverized. However, the manganese dioxides are not directly involved in the formation of the electrolytically deposited product EMD, but are held suspended uniformly and at a substantially constant concentration in the electrolyte throughout the electrolytic process. Thus, according to the present invention, the electrolyte is kept in a very thin slurry-like state throughout the electrolytic process. Hereinafter, the aforementioned electrolytic process shall be referred to as a "slurry method".

A substantial advantage of the slurry method is that a high current density is available. For instance, in the ordinary method, maximum current density for carbon anodes is about 1.2 $A/dm^2$, and 0.8 $A/dm^2$ for titanium anodes. On the other hand, 1.6 $A/dm^2$ is possible for titanium anodes in the slurry method. This figure suggests that initial investment to install a new electrolytic plant will be much reduced by applying the slurry method.

However, the slurry method has problems of its own which are difficult to solve as compared with the ordinary method. That is to say, most of the large particles of manganese oxides settle down immediately after the slurry is introduced into the electrolytic cell. The concentration of the slurry at the electrodes continuously changes by settling or precipitation of particles, thermal turbulent flow and other factors. Therefore, a great deal of skill is necessary to satisfactorily carry out the slurry method.

The most important aspect of the slurry method relates to the concentration of manganese oxides in the sulfate solution. Although the principle of the slurry method is not fully understood yet, the particles of manganese oxides have some effect on the electrolysis. Among the oxides of manganese are $MnO_2$, $Mn_2O_3$, $Mn_3O_4$ and $MnO$. Of these, $MnO_2$ and $Mn_2O_3$ are best-suited for the slurry method. Further, for the slurry method according to the present invention, the manganese oxide particles should be under 325 mesh in size, the finer the better. If the particle size is larger than 325 mesh, the particles will too easily settle or precipitate in the electrolytic solution. As to the concentration of particles of manganese oxides in the electrolytic solution suitable for the slurry method, the following experiment was conducted.

EXPERIMENT 1

Figure 1:
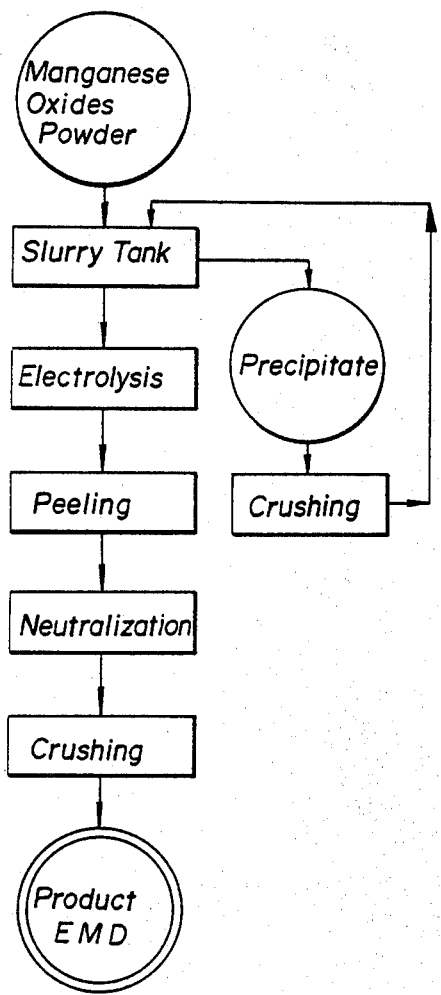
FIG. 1 is a Flow Chart showing the steps of producing product EMD from the point where Manganese Oxides Powder is placed into a slurry tank.

A titanium anode of 1.0 m in length, 0.5 m in width and 4 mm in thickness and a carbon cathode were provided in a cell 1.4 m deep, 0.6 m wide and 1.2 m long.

Then, 1 mole/l aqueous solutions of $MnSO_4$ containing varying amounts of manganese oxides, such that their concentration in the solution was 0.04, 0.4, 0.5 and 5 g/l were each introduced into a cell of the type described. During electrolysis, electrolyte at the upper, middle and lower parts of the titanium anode were pipetted out from each of the thus prepared solutions (or suspensions, as they may be more properly referred to). The pipetted samples had the concentrations as shown in Table I.

TABLE I

| | Concentration of Suspended Manganese Oxides (g/l) | | | |
| --- | --- | --- | --- | --- |
| | Concentration of introduced manganese oxides (g/l) | | | |
| | 0.01 | 0.4 | 0.5 | 5 |
| Upper part | 0.007–0.009 | 0.07–0.18 | 0.10–0.32 | 1.70–3.19 |
| Middle part | 0.008–0.01 | 0.15–0.28 | 0.27–0.51 | 3.34–6.50 |
| Lower part | 0.02–0.03 | 0.25–0.45 | 0.45–0.80 | 5.37–9.11 |

The data of Table I shows that significantly large differences in concentration exist among the upper, middle and lower parts in the case of suspensions having 0.5 and 5 g/l of manganese oxides as introduced into the cell. On the other hand, where suspensions having 0.01 and 0.4 g/l of manganese oxides were introduced, the differences in concentration are far less significant. After electrolysis was complete, the manner of deposition of manganese dioxide on the surface of the titanium anodes was observed. In the case of the suspensions containing 0.5 and 5 g/l of manganese oxide as introduced, the thickness of manganese dioxide deposited on the anodes had significantly large differences among the upper, middle and lower parts of the anodes, and severe peeling was observed. In the case of suspensions containing 0.01 and 0.4 g/l of manganese oxide as introduced, the deposited material had a nearly even thickness without peeling and showed favorable flatness. Further in this connection, the importance of the concentration of manganese oxides as added to the electrolytic solution is clearly shown by the following experiment.

EXPERIMENT II

In the cell type employed, one hundred sheets of titanium anodes were opposed to carbon cathodes in a cell 5.5 m long, 1.3 m wide and 1.4 m deep. Then, 1 mole/l aqueous solutions of manganese sulfate were prepared, the solutions having concentrations of particles of manganese oxides which varied in the range of 0.02–0.07 g/l in the cell. Each solution was then tested in a cell of the type described.

Electrolysis was continued for 6 days at a current density of 1.4 A/dm$^2$. During electrolysis, the cell voltage was between 2.2 to 3.5 V. At the end of electrolysis the anodes were drawn up and examined. This experiment was then repeated, the concentration of the initially introduced manganese oxides being changed to vary from 0.045 g/l to 0.065 g/l. In yet another repetition of the experiment, the concentration of the dispersed manganese oxides was varied from 0.5 to 0.8 g/l. The results of these experiments are shown in Table II.

TABLE II

| Concentration of manganese oxides as dispersed in the cell (g/l) | State of anode deposits |
|---|---|
| 0.02–0.07 | There was no significant fluctuation in thickness. There was also no peeling or breaking. |
| 0.5–0.8 | Significant peeling was observed. Some parts of deposit were separated from anodes and fell down into the cell. |

Observation of deposit on anodes,

As mentioned above, in the slurry method of this invention, it is important to supply manganese oxides slurry having definite particle size and definite concentration. In the process of the ordinary method, the aqueous solution of manganese sulfate is stored in a vessel and poured into the electrolytic cell. In the slurry method, additional steps may be necessary to assure proper adjustment of slurry concentration.

Figure 2:
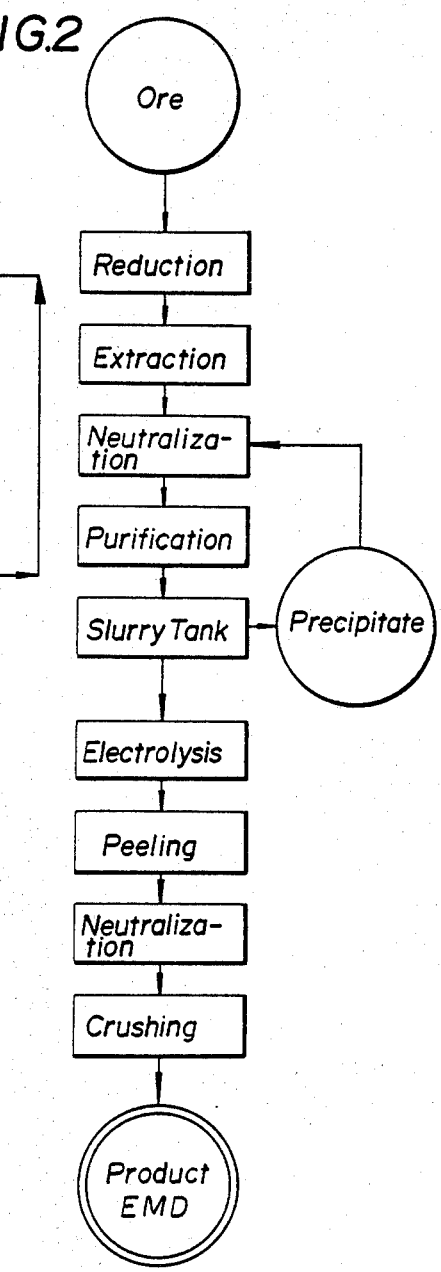
FIG. 2 is a Flow Chart showing the steps of producing product EMD from ore.

Several methods may be used for adjusting the slurry concentrations. One method is to use a storage vessel to attain a proper concentration of the manganese oxides slurry therein. In this method, the concentration of the manganese oxides in the aqueous solution of manganese sulfate to be supplied into the cells in adjusted is the storage vessel. During the course of applying this method, most of the larger particles will settle or precipitate on the bottom of the vessel, and the supernatant part of the slurry solution is used in the cells, the appropriate concentration having been attained therein. The precipitated or settled manganese oxides particles may be recycled as a raw material for the slurry. FIG. 1 and 2 show typical recycling comprising crushing the precipitates, preferably under wet conditions. In FIG. 1, the recycling is incorporated in a slurry process which begins with manganese oxides powder. In FIG. 2, ores are the starting point.

To utilize the precipitates in the recycling operation some problems are encountered in handling. First, the precipitate normally carries some quantity of the aqueous solution of manganese sulfate. This means that crushing under dry conditions is disadvantageous and also indicated that the crushing apparatus must be resistant to acidic conditions. Second, there must be no contamination during crushing. The inventors have discovered that it is preferable to use an alumina ball mill under wet conditions for overcoming such difficulties. The recycling process is illustrated by the following experiment.

EXPERIMENT III

An aqueous solution of manganese sulfate having a concentration of 1 mole/l was put into a 10l slurry storage vessel. Then manganese dioxide powder was added thereto to obtain a slurry concentration of 1 g/l. The size distribution of the manganese dioxide added was as follows:

| Mesh size | more than 100 | 100–200 | 200–325 | less than 325 |
|---|---|---|---|---|
| % | 5 | 10 | 15 | 70 |

The supernatant of the slurry solution containing suspended manganese oxides particles of appropriate concentration was siphoned out and poured into the electrolytic cells. A manganese oxides precipitate was observed on the bottom of the Vessel. The size distribution of the deposited oxides was as follows:

| Mesh size | more than 100 | 100–200 | 200–325 | less than 325 |
|---|---|---|---|---|
| % | 27 | 42 | 18 | 13 |

When the precipitate was crushed for two hours by using an alumina ball mill under wet conditions, the size distribution of the oxides was changed as follows:

| Mesh size | more than 100 | 100–200 | 200–325 | less than 325 |
|---|---|---|---|---|
| % | 0 | 8 | 17 | 75 |

The ground oxides powder was recycled to the slurry storage vessel. When this procedure was repeated throughout the electrolysis operation, improved electrolytic effects were observed, as shown in the following table.

| | Current efficiency % | Consumption of manganese oxides for slurry formation (kg. ton of EMD) | Condition of deposited material |
|---|---|---|---|
| No recycling | 96.5 | 12.8 | Good |
| Recycling | 96.8 | 3.5 | Good |

These results show a remarkable decrease in the quantity of manganese oxides powder consumed for forming the slurry.

Dispersal of the manganese oxide particles as completely as possible in the manganese sulfate electrolyte is also important. One method for accomplishing this is to utilize ultrasonic waves. The following illustrates the usefulness of this method.

Preliminary data showed that electrolytic voltage at the starting stage should preferably be low to permit enough time for electrolysis if the size distribution and slurry particle size are small as they preferably are. An illustrative example of this data is shown in the following table.

| Electrolyte No. | Particle size of manganese oxides. | | Electrolytic voltage at initial stage (V) | Electrolytic duration to reach 3V (HR) | State of deposit on anode surface |
|---|---|---|---|---|---|
| | Mean ($\mu$) | Range ($\mu$) | | | |
| A | 30 | 15–74 | 2.6 | 5 | Peeled |
| B | 15 | 1–44 | 2.4 | 19 | Peeled |
| C | 7 | less than 20 | 2.1 | 30 | Good |

The electrolytes A, B and C were treated with an ultrasonic wave vibration generator of 19 KHz for one minute, respectively. Electrolytic results of the treated cases were as follows:

| Electrolyte No. | Particle size of manganese oxides. | | Electrolytic voltage at initial stage (V) | Electrolytic duration to reach 3V (HR) | State of deposit on anode surface |
|---|---|---|---|---|---|
| | Mean ($\mu$) | Range ($\mu$) | | | |
| A | 28 | 15–74 | 2.3 | 12 | Peeled |
| B | 13 | 1–33 | 2.1 | 28 | Good |
| C | 7 | less than 20 | 2.0 | 32 | Good |

The results showed that, in the case of A, the state of anode surface deposition was not satisfactory, which was mainly due to a high content of larger particles therein. However, in the case of B, satisfactory results were obtained and the state of anode surface deposition was significantly improved. Of course, a significant improvement could also be observed in the case of C.

What is claimed is:

1. A process for producing electrolytic manganese dioxide comprising electrolysis of an electrolyte comprising manganese sulfate containing a slurry of manganese oxides, wherein the manganese oxides are present in an amount from 0.01 to 0.4 grams per liter of electrolyte, said manganese oxide being no larger than 325 mesh in size.

2. The process of claim 1 wherein the electrolyte is an aqueous solution of manganese sulfate.

3. The process of claims 1, or 2 wherein said manganese oxides are selected from the group consisting of $MnO_2$ and $Mn_2O_3$.

4. The process of claim 3 in which the slurry is subjected to ultrasonic vibrations prior to electrolysis.

5. The process of claims 1 or 2, in which the slurry is subjected to ultrasonic vibrations prior to electrolysis.

6. The process of claim 5 in which the ultrasonic vibrations have a frequency of 19 KHz.

7. Process for producing electrolytic manganese dioxide according to claims 1 or 2 characterized by adding manganese oxides to an electrolyte comprising manganese sulfate at a concentration of 0.01 to 0.4 g/l, mixing said manganese oxides previously with said electrolyte to form a slurry, and sedimenting said slurry in a storage sedimentation tank, whereby a supernatant suspension is obtained, having the desired particle concentration.

8. A process for preparing an electrolytic composition for producing electrolytic manganese dioxide comprising mixing manganese oxide with an electrolyte comprising manganese sulfate to form a slurry, and sedimenting said slurry in a storage sedimentation tank, the supernatant suspension being the desired composition wherein the manganese oxides are present in an amount from 0.01 to 0.4 gram per liter of electrolyte, said manganese oxides being no larger than 325 mesh in size.

9. A process for preparing an electrolytic composition as in claim 8 further comprising obtaining the manganese oxides by recycling the manganese oxides sediment obtained from a previous application of said process.

10. A process as in claim 9 further comprising crushing said manganese oxides sediment.

11. A process as in claim 10 wherein said manganese oxides sediment is crushed while wet.

12. A process as in claim 10 or 11 in which said manganese oxides sediment is crushed in an alumina ball mill.

13. An electrolytic composition for producing electrolytic manganese dioxide, comprising an aqueous manganese sulfate solution and manganese oxides suspended therein, characterized in that the manganese oxides are used in an amount of 0.01 to 0.4 g/l electrolyte and have a particle size of less than 325 mesh (0.044 mm).

14. The composition of claim 13, wherein said manganese oxides are selected from the group consisting of $MnO_2$ and $Mn_2O_3$.

15. An electrolytic composition according to claim 13, characterized in that manganese oxides previously treated with ultrasonic vibrations are used.

16. An electrolytic composition according to claim 13, characterized in that manganese oxides are used which have been previously treated in an alumina ball mill.

* * * * *